(12) United States Patent
Shannon et al.

(10) Patent No.: US 9,106,528 B2
(45) Date of Patent: *Aug. 11, 2015

(54) LINK AGGREGATION PROTECTION

(75) Inventors: Frank M. Shannon, Arnold, MD (US); Roman Krzanowski, White Plains, NY (US); Vincent A. Alesi, Yorktown Heights, NY (US); William A. Bjorkman, Odenton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/533,231

(22) Filed: Jun. 26, 2012

(65) Prior Publication Data

US 2012/0266013 A1 Oct. 18, 2012

Related U.S. Application Data

(63) Continuation of application No. 12/549,733, filed on Aug. 28, 2009, now Pat. No. 8,213,296.

(60) Provisional application No. 61/178,477, filed on May 14, 2009.

(51) Int. Cl.
| | |
|---|---|
| *H04L 12/26* | (2006.01) |
| *H04L 12/24* | (2006.01) |
| *G06F 11/20* | (2006.01) |
| *G06F 15/173* | (2006.01) |
| *H04L 12/709* | (2013.01) |

(52) U.S. Cl.
CPC ............ *H04L 41/08* (2013.01); *H04L 41/0681* (2013.01); *H04L 41/0873* (2013.01); *H04L 45/245* (2013.01)

(58) Field of Classification Search
None
See application file for complete search history.

(56) References Cited

U.S. PATENT DOCUMENTS

| | | | | |
|---|---|---|---|---|
| 6,819,680 | B2 * | 11/2004 | Hickman et al. | 370/475 |
| 7,478,154 | B2 * | 1/2009 | Cochran et al. | 709/224 |
| 7,668,081 | B2 * | 2/2010 | Hermsmeyer et al. | 370/218 |
| 8,004,968 | B2 * | 8/2011 | Sajassi et al. | 370/228 |
| 8,089,965 | B2 * | 1/2012 | Mitsumori | 370/390 |
| 8,264,953 | B2 * | 9/2012 | Licardie et al. | 370/225 |
| 8,300,523 | B2 * | 10/2012 | Salam et al. | 370/220 |
| 8,472,325 | B2 * | 6/2013 | Yong et al. | 370/237 |
| 2004/0085894 | A1 * | 5/2004 | Wang et al. | 370/216 |
| 2006/0227704 | A1 * | 10/2006 | Nakagawa et al. | 370/217 |
| 2008/0002570 | A1 * | 1/2008 | Kurokawa et al. | 370/219 |
| 2008/0089236 | A1 * | 4/2008 | Kotrla et al. | 370/242 |
| 2008/0089326 | A1 * | 4/2008 | Kotrla et al. | 370/389 |
| 2008/0240133 | A1 * | 10/2008 | Tanaka | 370/401 |
| 2008/0298236 | A1 * | 12/2008 | Ervin et al. | 370/232 |
| 2009/0232152 | A1 * | 9/2009 | Chen | 370/419 |
| 2010/0165831 | A1 * | 7/2010 | Elie-Dit-Cosaque et al. | 370/217 |

* cited by examiner

*Primary Examiner* — Candal Elpenord

(57) ABSTRACT

A method includes detecting, by a first network device, a configuration problem at a second network device, where the first and second network devices are associated with a link aggregation group (LAG) coupling the first and second network devices. The method also includes de-activating, by the first network device, one or more links in the LAG in response to detecting the configuration problem. The method further comprises maintaining at least one of the links in the LAG as an active link and allowing traffic to be forwarded on the active link in the LAG.

20 Claims, 6 Drawing Sheets

LINK AGGREGATION PROTECTION

RELATED APPLICATION

This application is a continuation of U.S. patent application Ser. No. 12/549,733 filed Aug. 28, 2009, the disclosure of which is hereby incorporated herein by reference in its entirety. This application also claims priority under 35 U.S.C. §119 based on U.S. Provisional Patent Application No. 61/178,477, filed May 14, 2009, the disclosure of which is also hereby incorporated herein by reference in its entirety.

BACKGROUND INFORMATION

Link aggregation is a mechanism used to route data between end points using multiple network links and/or ports. For example, a link aggregation group (LAG) may include two or more physical links connecting two end point devices. In a LAG, the physical links are configured to act as a single logical connection between the end point devices. Link aggregation may be used to increase overall data throughput between the end point devices.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to link aggregation. In one exemplary implementation, when a network device associated with a LAG detects an improper configuration/misconfiguration at one of the network devices associated with the LAG or some other problem associated with the LAG, the network device may shut down one of the links in the LAG, while leaving one of the links in the LAG in an operable condition. In this manner, some data may be transmitted between the end point devices when the LAG is experiencing problems. In another exemplary implementation, when an improper configuration associated with the LAG or another problem associated with the LAG is detected by an interface device, the interface device may send a control message to the end point devices to shut down the LAG.

Figure 1:
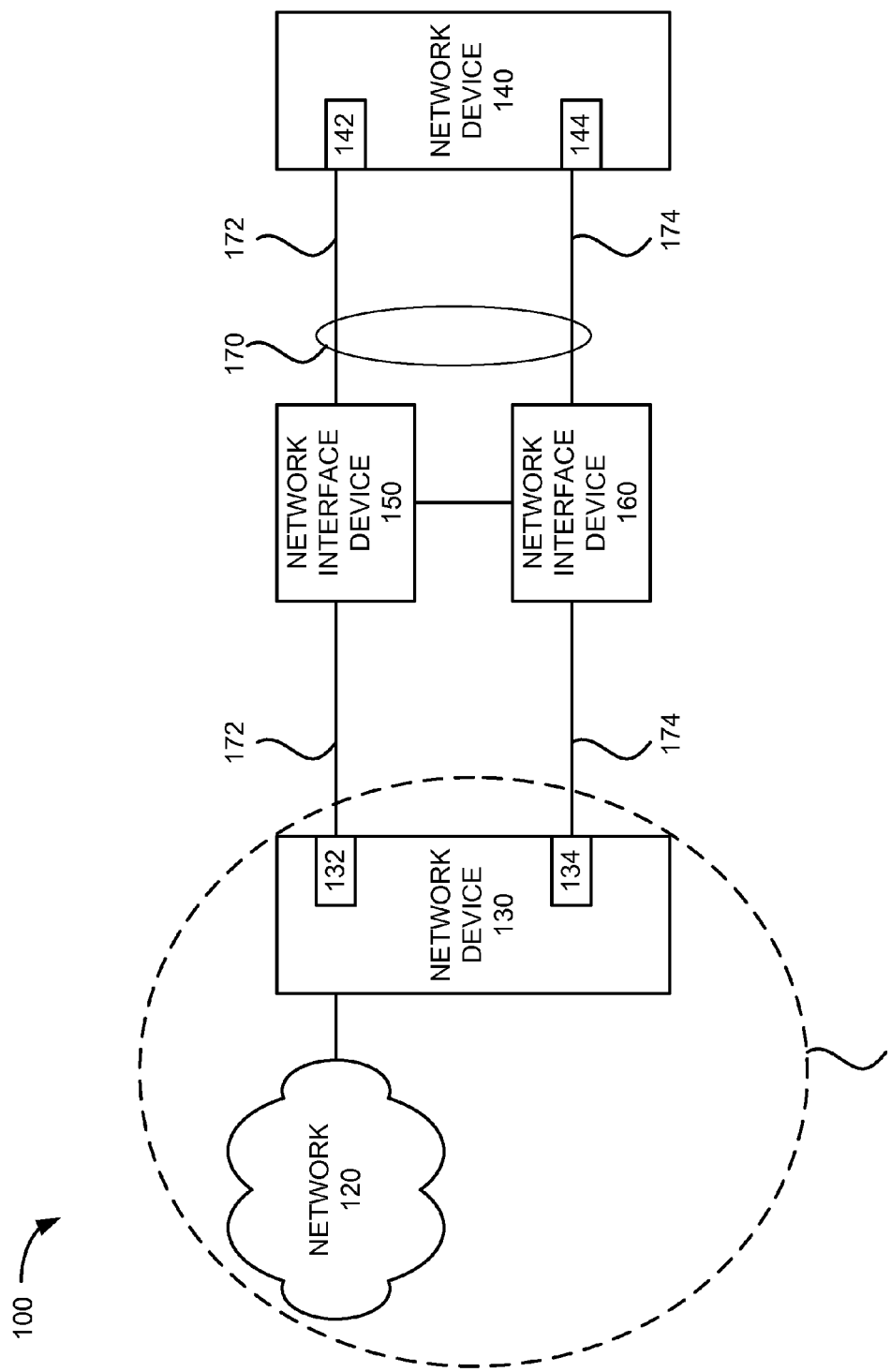
FIG. 1 illustrates an exemplary network in which systems and methods described herein may be implemented.

FIG. 1 is a block diagram of an exemplary network 100 in which systems and methods described herein may be implemented. Network 100 may include network 120, network devices 130 and 140, network interface devices (NIDs) 150 and 160 and links 172 and 174. In an exemplary implementation, network 120 and network device 130 may be part of spanning tree protocol (STP) domain 110 (illustrated within the dotted line in FIG. 1) that includes network 120. In one implementation, network 120 may include a switched Ethernet system/network (SES). Alternatively, network 120 may represent any network in which data is transmitted from customer sites to other devices in network 100.

In an exemplary implementation, network device 130 may represent a switch, such as a layer 2 switch, that is used to transmit or forward traffic to other devices in network 100. In one implementation, network device 130 may represent an external network to network interface (ENNI). That is, network device 130 may represent the interface between network 120 and external devices/network. Network device 130 may include edge ports 132 and 134 used to forward and receive data from other devices in network 100 via links 172 and 174. Only two edge ports are shown on network device 130 for simplicity. It should be understood that network device 130 may include additional ports (e.g., edge ports) for receiving and transmitting data.

Network device 140 may represent a switch, such as a layer 2 switch, used to transmit or forward traffic to other devices in network 100, such as network device 130. In an exemplary implementation, network device 130 may be coupled to network device 140 via a LAG. For example, referring to FIG. 1, network device 130 may be coupled to network device 140 via LAG 170, which includes links 172 and 174.

Links 172 and 174 may included wired, wireless and/or optical transmission media coupling network devices 130 and 140 in a LAG configuration. A LAG, as discussed briefly above, includes two or more links that are configured to act as a single logical connection between the end point devices. Therefore, in this implementation, LAG 170 includes links 172 and 174 that are configured to act as a single logical connection for routing data between network devices 130 and 140.

NIDs 150 and 160 may each represent an interface device that monitors traffic flowing between various networks/network devices. For example, NIDs 150 and 160 may each be positioned as a "bump-in-the-wire" between network devices 130 and 140. In an exemplary implementation, NIDs 150 and 160 may demarc the edge of a network, such as network 120 and/or STP domain 110. In such implementations, NIDs 150 and 160 may monitor or police traffic for service level agreement (SLA) purposes, may be used for various testing purposes, etc. In one implementation, NIDs 150 and 160 may not actively participate in the LAG configuration. In such an implementation, NIDs 150 and 160 may pass all link aggregation control protocol (LACP) frames and may not take action related to the status of LAG 170. NIDs 150 and 160, however, may identify problems with LAG 170 and signal network devices 130 and/or 140 to shut down LAG 170, as described in more detail below.

The network configuration illustrated in FIG. 1 is provided for simplicity. It should be understood that a typical network 100 may include more or fewer network devices, NIDs and links. For example, a LAG may include more than two links. Network 100 may also include additional elements, such as gateways, routers, monitoring systems, etc., that aid in routing traffic and monitoring a LAG.

Figure 2:
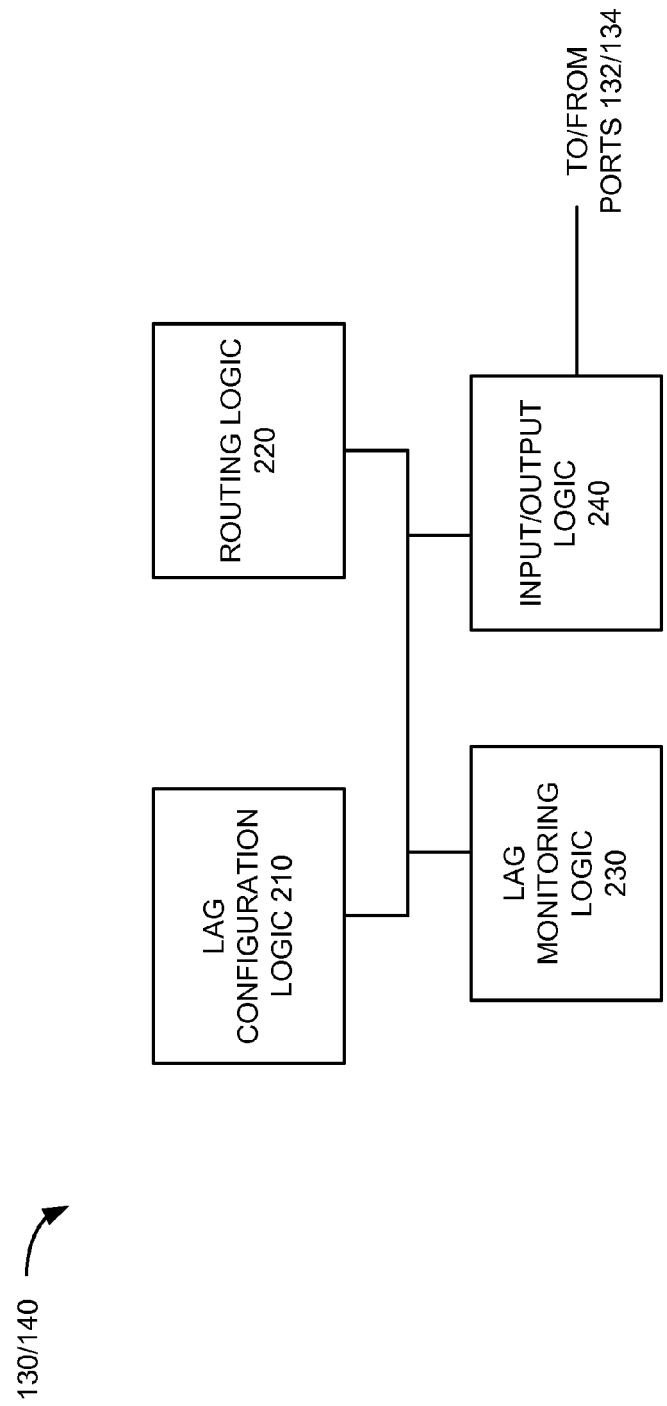
FIG. 2 illustrates an exemplary configuration of logic components implemented in the network devices of FIG. 1.

FIG. 2 illustrates an exemplary configuration of network device 130. Network device 140 may be configured in a similar manner. Referring to FIG. 2, network device 130 may include LAG configuration logic 210, routing logic 220, LAG monitoring logic 230 and input/output logic 240. The exemplary configuration illustrated in FIG. 2 is provided for simplicity. It should be understood that network devices 130 and 140 may include more or more fewer logic devices than illustrated in FIG. 2.

LAG configuration logic 210 may include logic that is associated with configuring a LAG. For example, LAG configuration logic 210 of network device 130 may include logic for setting up parameters for a LAG, such as LAG 170, between network device 130 and network device 140. For example, LAG configuration logic 210 may be associated with configuring a speed at which data will be transmitted via the LAG, configuring the number of links in the LAG, configuring which ports will transmit/receive via the LAG links, configuring one network device in the LAG group as a master device and another as a slave device, configuring the LAG for automated set up in which the LAG is automatically configured, configuring the LAG for manual set up requiring an operator to set up the LAG, etc.

Routing logic 220 may include logic for routing data between end point devices. For example, routing logic 220 may route data frames between network devices 130 and 140 via LAG 170.

LAG monitoring logic 230 may include logic used to detect whether a LAG is misconfigured or experiencing an other problem. For example, LAG monitoring logic 230 may determine whether parameters set up at network device 140 are compatible with LAG parameters set up at network device 130. For example, LAG monitoring logic 230 may determine that the speed at which network device 140 is sending data via LAG 170 is not compatible with the speed at which network device 130 is configured to receive and send data. As another example, LAG monitoring logic 230 may determine that both network device 130 and 140 are configured as master devices for LAG 170. As still another example, LAG monitoring logic 230 may determine that network device 130 is configured for automated LAG set up, while network device 140 is configured for manual LAG set up. In each case, LAG monitoring logic 230 may identify an improper configuration associated with a LAG in which network device 130 is participating and perform various actions in response to detecting the improper configuration, as described in detail below.

Input/output logic 240 may include logic for receiving and outputting data frames via network devices 130/140. For example, input/output logic 240 may route data to ports 132 and 134 for transmission to network device 140 and receive data at ports 132 and 134 transmitted from network device 140.

In an exemplary implementation, LAG configuration logic 210, routing logic 220, LAG monitoring logic 230 and input/output logic 240 may include one or more processors, microprocessors or other processing logic used to interpret and execute instructions. In such implementations, LAG configuration logic 210, routing logic 220, LAG monitoring logic 230 and input/output logic 240 may include software instructions stored in a computer-readable medium. A computer-readable medium may be defined as one or more memory devices. The software instructions may be read into memory from another computer-readable medium or from another device via a communication interface. The software instructions contained in memory may cause the various logic components, such as LAG configuration logic 210, routing logic 220, LAG monitoring logic 230 and input/output logic 240, to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

Figure 3:
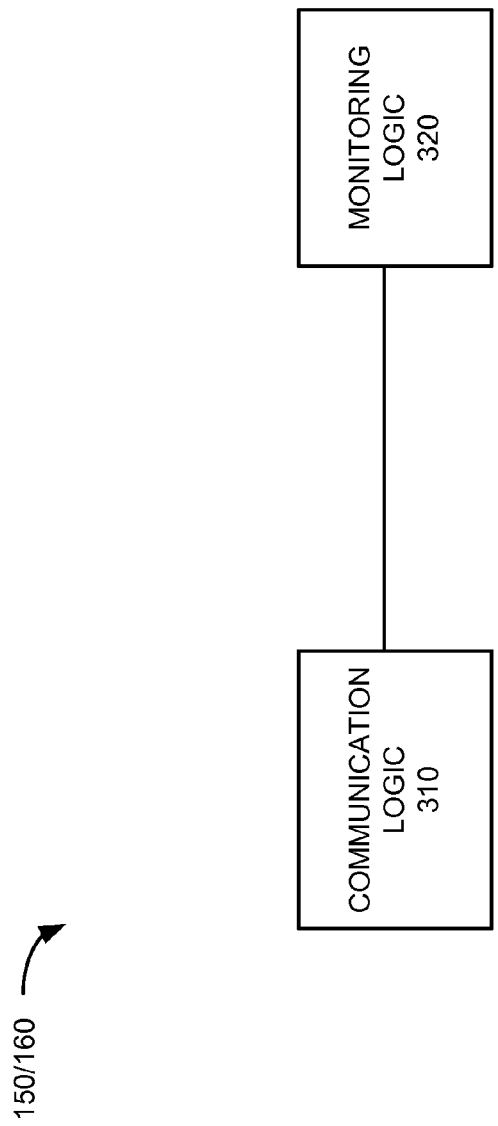
FIG. 3 illustrates an exemplary configuration of logic components implemented in the network interface devices of FIG. 1.

FIG. 3 illustrates an exemplary configuration of NID 150. NID 160 may be configured in a similar manner. Referring to FIG. 3, NID 150 may include communication logic 310 and monitoring logic 320. The exemplary configuration illustrated in FIG. 3 is provided for simplicity. It should be understood that NIDs 150 and 160 may include more or more fewer logic devices than illustrated in FIG. 3.

Communication logic 310 may include logic that allows a NID, such as NID 150, to communicate with other devices, such as NID 160. For example, referring to FIG. 1, NIDs 150 and 160 may be coupled to each other. Communication logic 310 may allow NIDs 150 and 160 to communicate with each other in a peer-to-peer fashion. Communication logic 310 may also allow NIDs to forward various information, such as control information, to other devices in network 100. For example, communication logic 310 may allow NID 150 to send control messages to network devices 130 and 140 when a LAG is experiencing problems, as described in more detail below.

Monitoring logic 320 may include logic that monitors data being transmitted in network 100. For example, monitoring logic 320 may monitor data, such as link aggregation control protocol (LACP) frames, being transmitted on LAG 170. In some implementations, monitoring logic 320 may detect the lack of LACP frames from one or both of network devices 130 and 140 over a predetermined period of time. In response to not detecting LACP frames over a period of time, monitoring logic 320 may signal communication logic 310 to transmit a "shut down" message to one or more end point devices, such as network devices 130 and 140. The "shut down" message may instruct the end point devices (e.g., network devices 130 and 140) to shut down a LAG, such as LAG 170, as described in detail below.

In an exemplary implementation, communication logic 310 and monitoring logic 320 may include one or more processors, microprocessors or other processing logic used to interpret and execute instructions. In such implementations, communication logic 310 and monitoring logic 320 may include software instructions stored in a computer-readable medium. A computer-readable medium may be defined as one or more memory devices. The software instructions may be read into memory from another computer-readable medium or from another device via a communication interface. The software instructions contained in memory may cause the various logic components, such as communication logic 310 and monitoring logic 320, to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

In certain situations, one or more of the LAG interfaces on network device 130 or network device 140, or one or more LAG parameters associated with a LAG in which network devices 130 and 140 are participating may be improperly configured or may become misconfigured. In conventional network devices that form end points in a LAG, the far end point device (e.g., the switch located at the opposite end of network 100) may not detect the misconfiguration. For example, a conventional switch acting as an end point in a LAG is not configured to support various types of error detection functions with respect to the far end network switch. As a result, in a conventional network, a LAG or LAG interface misconfiguration may cause the links in the LAG to revert to the configuration in which links in the LAG will function as independent links. In addition, if the links in a LAG are not configured with STP, and since the ENNI interfaces of a switch may be configured as edge ports, the links in a LAG may be regarded by conventional network end point switches as independent links. In such instances, the links (and end point network devices) may be flooded by multicast and broadcast traffic. Such flooding may result in a broadcast storm spreading over an STP domain, such as STP domain 110. In conventional networks, such flooding could bring down a user's network, such as network 120, resulting in failures for all customers in that network.

In addition, in some instances, when a network device, such as network device 130 views links 172 and 174 as separate links, and not as a single logical interface, network device 130 may be unable to determine which link on which to send data. Still further, in some instances, a receiving network device, such as network device 140 may receive a frame with an unknown address and send it back to the sending network device (e.g., network device 130). This may create a loop condition in which data is being sent back and forth between network devices/switches. Such a loop condition may overload the switch and potentially cause a failure in the user's network (e.g., network 120).

As discussed above, in some instances, the misconfiguration of a LAG or LAG interface associated with a network device, such as network device 130 or 140, connected over the ENNI to switches in a network, such as network 120, may cause failure of the entire network and customers using this network/service may be effectively shut down. Conventional standards associated with link aggregation, such as IEEE 802.3ad-2005, do not address the behavior or mechanism for protection against a loop condition or other problem due to misconfiguration at a far end of the network, such as at an end point device located at an opposite end of a LAG, as described above. In an exemplary implementation, when a failure at one end of network 100 occurs (e.g., a failure at network device 130 or 140), mechanisms for protecting network 100 may allow network 100 to continue operating, as described in detail below.

Figure 4:
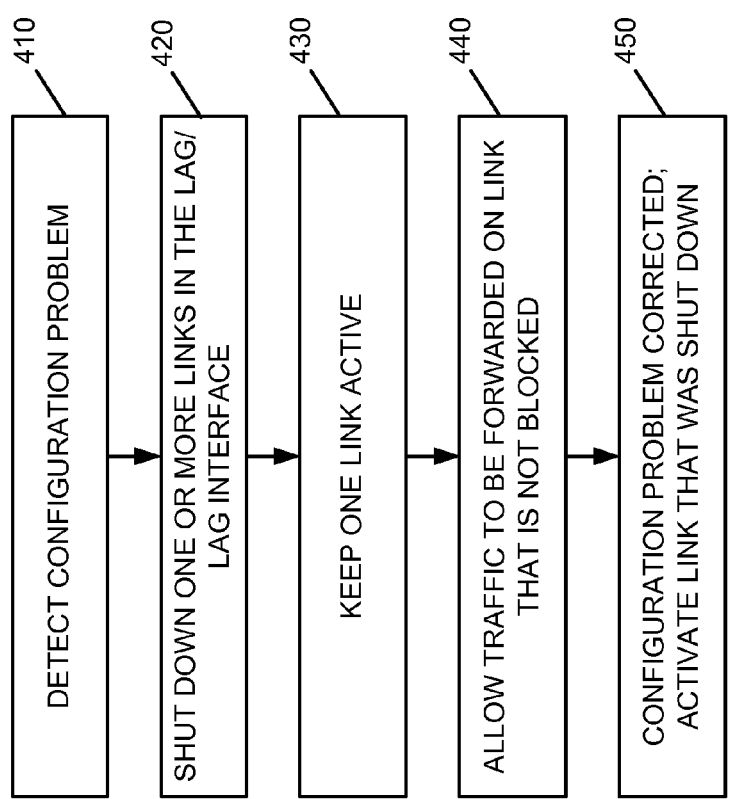
FIG. 4 is a flow diagram illustrating processing associated with the network of FIG. 1 in accordance with an exemplary implementation.

FIG. 4 illustrates exemplary processing associated with handling a misconfiguration or other error condition at one end of network 100. Processing may begin when LAG monitoring logic 230 on network device 130 (or network device 140) detects that the far end LAG interface is misconfigured or is experiencing some type of error condition (act 410). For example, LAG monitoring logic 230 on network device 130 may determine that the speed at which network device 140 is sending data via LAG 170 is not compatible with the speed at which network device 130 is configured to receive and send data. Alternatively, LAG monitoring logic 230 may determine that both network device 140 and network device 130 are configured to operate as master devices (or slave devices) for LAG 170. As still another example, LAG monitoring logic 230 may determine that network device 140 is configured for automatic LAG set up, while network device 130 is configured for manual LAG set up. LAG monitoring logic 230 may also detect other types of configuration problems with respect to the far end network device (i.e., network device 140 in this example). That is, LAG monitoring logic 230 of network device 130 is able to monitor and determine that various types of errors or problems exist with network device 140 operating as an end point device in LAG 170.

In each case, assume that LAG monitoring logic 230 of network device 130 detects a configuration error or problem associated with network device 140 and/or the LAG interface of network device 140. In some systems, such an error will result in network device 130 dropping the LAG interface and reverting to two non-LAG links. That is, network device 130 will treat links 172 and 174 as non-LAG links, as opposed to treating links 172 and 174 as a single logical interface.

In accordance with an exemplary implementation, network device 130 may shut down or block one or more of the links in LAG 170 (act 420). For example, in the scenario illustrated in FIG. 1 in which two links 172 and 174 are included in LAG 170, network device 130 may shut down or block link 172 and leave link 174 in an active or open state (act 430). In situations in which the LAG includes more than two links, network device 130 may shut down or block all but one of the links in the LAG. In each case, one link will remain operational. In other instances, more than one link may remain operational. That is, for a large LAG including three or more links, network device 130 may leave two or more links in the LAG operational.

Network device 130 may use the link that is not blocked to allow traffic to be forwarded (act 440). For example, assume that link 172 is shut down or blocked. In this case, routing logic 220 may allow traffic associated with, for example, a particular virtual local area network (VLAN) identifier (ID) or traffic associated with a particular range of VLAN IDs to be forwarded via input/output logic 240 on link 174. The particular VLAN ID/range of VLAN IDs may be configurable at network devices 130 and 140. For example, a network engineer may program routing logic 220 on network device 130 (and routing logic 220 on network device 140) to allow traffic associated with particular VLAN IDs/ranges of VLAN IDs to be forwarded in situations where a misconfiguration or other problem exists. Traffic received by network devices 130 and 140 not having the particular VLAN IDs/ranges of VLAN IDs may not be forwarded.

In addition (or alternatively), on the link that is not blocked (i.e., link 174 in this example), routing logic 220 may allow traffic having particular media access control (MAC) addresses or particular ranges of MAC addresses to be forwarded. Similar to the discussion above with respect to the VLAN IDs, the particular MAC addresses/ranges of MAC addresses may be configurable at network devices 130 and 140. For example, a network engineer may program routing logic 220 on network devices 130 and 140 to allow traffic associated with particular MAC addresses/ranges of MAC addresses to be forwarded in situations where a misconfiguration or other problem exists. Traffic received by network devices 130 and 140 not having the particular MAC addresses/ranges of MAC addresses may not be forwarded.

LAG monitoring logic 230 may continue to monitor LAG 170 after the misconfiguration is detected. Assume that LAG monitoring logic 230 determines that the misconfiguration problem no longer exists (act 450). For example, a technician may have corrected the problem at network device 140 or network device 140 may have automatically corrected the configuration problem associated with LAG 170. In either case, after the configuration problem is corrected, network device 130 and network device 140 may activate the previously de-activated link (i.e., link 172 in the above example) (act 450). Network devices 130 and 140 may then begin transmitting data on both links 172 and 174.

In the manner described above, traffic meeting particular criteria (e.g., having a particular VLAN ID, MAC address, etc.) may be forwarded via a link in LAG 170, while the other link in LAG 170 is down. This enables various users, such as users in network 120, to continue to send and receive data when a LAG is experiencing problems, while also avoiding flooding of traffic.

For example, as discussed above, in conventional networks, misconfigurations of end point devices, such as switches, may result in failures for all customers in a network.

For example, in a conventional network in which a LAG or LAG interface is experiencing problems and the links are then treated as independent links, flooding of multicast and broadcast traffic may result. For example multicast or broadcast traffic may be transmitted on both of links 172 and 174. Such flooding may bring down a network, such as network 120, resulting in failures for customers in network 120. In the manner described above, flooding is avoided and some data is permitted to be forwarded via a portion of LAG 170.

In accordance with another exemplary implementation described in detail below, NIDs 150 and 160 may detect a problem associated with a LAG. In such implementations, NIDs 150 and/or 160 may shut down the interfaces in both network devices 130 and 140 to prevent a broadcast storm or multicast storm from spreading into network 120 of STP domain 110, as described below.

Figure 5:
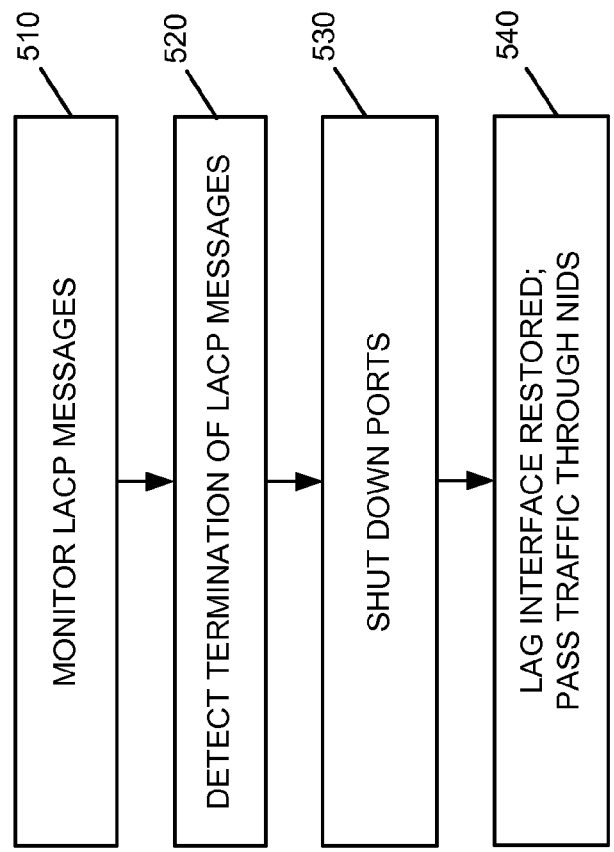
FIG. 5 is a flow diagram illustrating processing associated with the network of FIG. 1 in accordance with another exemplary implementation.

FIG. 5 is a flow diagram of exemplary processing associated with handling a misconfiguration or other error conditions at one end of network 100. Processing may begin with the NIDs configured on the LAG interfaces (i.e., NIDs 150 and 160 in this example) monitoring the flow of messages to/from network devices 130 and 140 (act 510). For example, in one implementation, NIDs 150 and 160 may monitor the flow of link aggregation control protocol (LACP) messages transmitted to/from network devices 130 and 140. LACP messages are control messages exchanged between the end point devices associated with a LAG. The LACP messages are typically transmitted at predetermined intervals when a LAG is operating normally.

Figure 6:
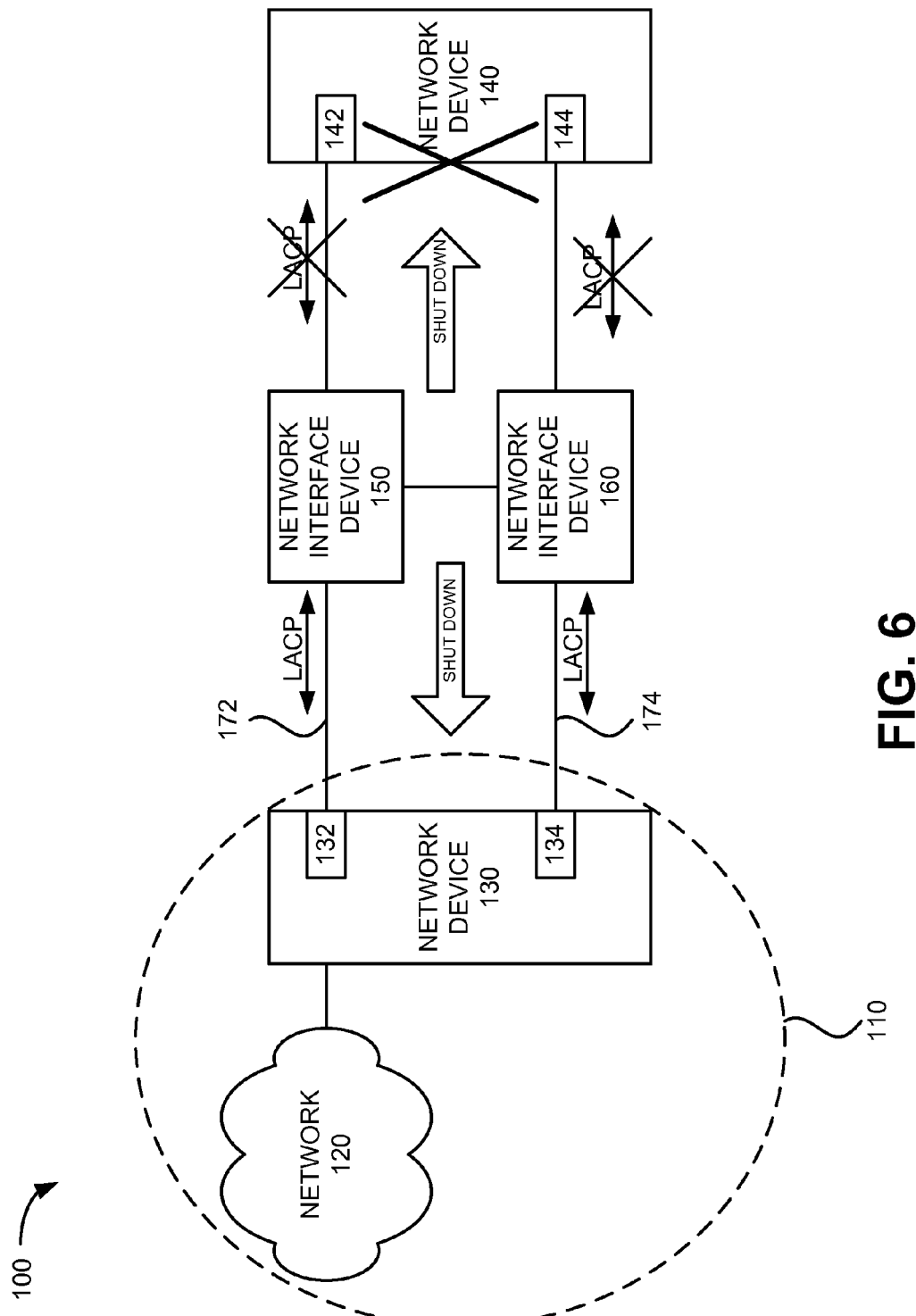
FIG. 6 illustrates the network of FIG. 1 in accordance with the flow diagram of FIG. 5.

Assume that a LAG interface failure occurs at network device 140. For example a configuration error may occur at the LAG interface of network device 140, as illustrated by the "X" at network device 140 in FIG. 6. In this case, LACP messages will typically stop flowing from/to the LAG interface. For example, LAG configuration logic 210 of network device 140 may stop transmitting LACP messages to network device 130, as illustrated by the smaller x's illustrated in FIG. 6. In this situation, one or both of NIDs 150 or 160 will detect the termination of LACP messages (act 520). That is, one or both of NIDs 150 and 160 will detect the absence or lack of LACP messages flowing from network device 140.

For example, assume that NID 150 detects no LACP messages from network device 140 over a period of time. In this case, NID 150 may shut down the ports at network devices 130 and 140 (act 530). That is, NID 150 may signal network device 130 to shut down edge ports 132 and 134. NID 150 may also signal network device 140 to shut down edge ports 142 and 144, as illustrated by the arrows labeled "shut down" in FIG. 6. These "shut down" messages may be transmitted from NID 150 via link 172. In some instances, NID 150 may communicate with NID 160 to shut down edge ports, such as edge port 134 and the corresponding edge port 144 on network device 140. In this case, NID 160 may transmit "shut down" messages to network devices 130 and 140 via link 174. In each case, shutting down edge ports on network devices 130 and 140 may prevent broadcast and multicast storms from spreading into STP domain 110 and network 120. When the LAG interface at network device 140 is restored (act 540), NIDs 150 and 160 may detect LACP messages from network devices 130 and 140. In response, NIDs 150 and 160 may pass the traffic without requiring any additional action by the operator (act 540). That is, NIDs 150 and 160 will allow traffic to pass to the destination device.

In an alternative implementation, when NIDs 150 and 160 detect that no LACP messages have been transmitted from network device 140 (or network device 130) over a period of time, NIDs 150 and 160 may shut down only one of links 172 and 174 and leave the other link active or open. In this situation, a loop condition will not be created and the problem at one of the network devices 130 or 140 will not completely disable the ENNI. Therefore, customer traffic may be allowed to traverse the active link, as opposed to a situation in which both links 172 and 174 are shut down.

As discussed above, it should be understood that a LAG may include more than two links. In some implementations, when a problem occurs on the LAG or LAG interface, NID 150 (or NID 160) may signal network devices 130 and 140 to shut down one or more of the links in the LAG, while leaving at least one link in the LAG as an active link to accommodate at least some customer traffic.

Implementations described herein provide for protecting a network when a configuration problem occurs in a LAG. For example, a first network device operating on an opposite end of a LAG from a second network device may detect a configuration problem with the second network device. The first network device detecting the problem may then shut down one of the links to avoid a loop condition or other error condition that may adversely impact customer traffic. This may allow one of the links of the LAG to continue operating.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, network devices 130 and 140 were described as monitoring a LAG/LAG interface, or NIDs 150 and 160 were described as monitoring the LAG/LAG interface. In some implementations, network devices 130/140 and NIDs 150/160 may simultaneously monitor a LAG/LAG interface and take the actions described above with respect to FIGS. 4 and 5 when an error or configuration problem is detected.

In addition, implementations have been described above with respect to a NID monitoring LACP messages from end point devices of a LAG. In other implementations, a NID may monitor other control messages that may be sent by a network device involved in a LAG. For example, a NID may monitor a "heartbeat" type message that a network device may transmit at periodic intervals to signal various information to other devices in a LAG when a LAG is operating properly. In still other instances, a NID may look for certain types of messages or sequences of messages that are indicative of exchanges between LAG end points to determine if a LAG is operating properly. In each case when the particular control message, type of messages or sequences of messages are not received, the NID (e.g., NID 150 or 160) may take actions as described above with respect to FIG. 5.

Still further, implementations have been described above with respect to monitoring and protecting a LAG. In other implementations, other types of aggregated or grouped interfaces/links that include a number of links that are used to transmit data between end points may be protected in a similar manner.

Still further, while series of acts have been described with respect to FIGS. 4 and 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   detecting, by a first network device, a configuration problem at a second network device, the first and second network devices being associated with a link aggregation group (LAG) coupling the first and second network devices, wherein the first network device includes a first port connected to a first link in the LAG and a second port connected to a second link in the LAG, wherein the first link in the LAG and the second link in the LAG are each connected to the first and second network devices, wherein the detecting a configuration problem comprises:
      determining that a transmission speed at the second network device for the LAG is configured differently than a transmission speed for the LAG at the first network device,
   de-activating, by the first network device, at least the first link in the LAG in response to detecting the configuration problem;
   maintaining at least the second link in the LAG as an active link;
   allowing traffic to be forwarded to the second network device from the second port of the first network device via the second link in the LAG;
   receiving, by the first network device and from an interface device coupled to at least one link in the LAG, a first message instructing the first network device to terminate transmission via the first link in the LAG; and
   receiving, by the second network device and from the interface device, a second message instructing the second network device to terminate transmission via the first link in the LAG.

2. The method of claim 1, wherein the allowing traffic comprises:
   allowing traffic having a particular virtual local area network (VLAN) identifier (ID) or a range of VLAN IDs to be forwarded on the active link, the method further comprising:
   blocking traffic not having the particular VLAN ID or range of VLAN IDs from being forwarded.

3. The method of claim 2, further comprising:
   configuring, at the first network device, the particular VLAN ID or range of VLAN IDs.

4. The method of claim 1, wherein the allowing traffic comprises:
   allowing traffic having a particular media access control (MAC) address or a range of MAC addresses to be forwarded on the active link, the method further comprising:
   blocking traffic not having the particular MAC address or range of MAC addresses from being forwarded on the active link.

5. The method of claim 4, further comprising:
   configuring, at the first network device, the particular MAC address or range of MAC addresses.

6. The method of claim 1, wherein the LAG comprises at least three links, wherein the maintaining at least the second link in the LAG as an active link comprises:
   maintaining the second link and a third link in the LAG as active links in the LAG.

7. The method of claim 1, further comprising:
   determining, by the first network device, that the configuration problem no longer exists;
   automatically activating at least the first de-activated link in the LAG, in response to determining that the configuration problem no longer exists; and
   transmitting data using all of the links in the LAG.

8. The method of claim 1, wherein the detecting, de-activating, maintaining and allowing is performed by the first network device without human intervention.

9. The method of claim 1, further comprising:
   setting up the LAG between the first network device and the second network device, the first and second network devices representing end point devices for the LAG.

10. The method of claim 1, wherein the detecting a configuration problem further comprises:
    determining that both the first and second network devices are configured as master devices or that both are configured as slave devices.

11. The method of claim 1, wherein the detecting a configuration problem further comprises:
    determining that one of the first or second network device is configured for an automated LAG set up and the other one of the first or second network device is configured for a manual LAG set up.

12. A device, comprising:
    a plurality of ports configured to transmit and receive data over a plurality of transmission links, the plurality of transmission links comprising a link aggregation group (LAG); and
    logic configured to:
       detect a configuration problem associated with a network device coupled to the device via the LAG, wherein the detecting a configuration problem comprises at least one of:
          determining that a transmission speed at the network device for the LAG is configured differently than a transmission speed for the LAG at the device,
          determining that one of the network device or the device is configured for an automated LAG set up and the other one of the network device or the device is configured for a manual LAG set up,
       de-activate one or more links in the LAG in response to detecting the configuration problem, maintain at least one of the links in the LAG as an active link, and allow traffic to be forwarded from the device to the network device on the active link in the LAG, wherein the links in the LAG are each connected to the device and the network device, wherein when allowing traffic, the logic is configured to:

allow traffic having at least one of a particular virtual local area network (VLAN) identifier (ID), a range of VLAN IDs, a particular media access control (MAC) address or a range of MAC addresses to be forwarded on the active link; and wherein the logic is further configured to:

block traffic not having the at least one of the particular VLAN ID, the range of VLAN IDs, the particular MAC address, or the range of MAC addresses from being forwarded on the active link.

13. The device of claim 12, wherein when allowing traffic, the logic is configured to:

allow traffic having the particular virtual local area network (VLAN) identifier (ID) or the range of VLAN IDs to be forwarded on the active link, and wherein the logic is further configured to:

block traffic not having the particular VLAN ID or the range of VLAN IDs from being forwarded on the active link.

14. The device of claim 12, wherein when allowing traffic, the logic is configured to:

allow traffic having the particular media access control (MAC) address or the range of MAC addresses to be forwarded on the active link, and wherein the logic is further configured to:

block traffic not having the particular MAC address or the range of MAC addresses from being forwarded on the active link.

15. The device of claim 12, wherein the logic is further configured to:

determine that the configuration problem no longer exists, automatically activate the one or more de-activated links in the LAG, in response to determining that the configuration problem no longer exists, and transmit data using all of the links in the LAG.

16. The device of claim 12, wherein the device and network device correspond to end point devices located at opposite ends of the LAG.

17. The device of claim 12, further comprising layer 2 switching logic.

18. The device of claim 12, wherein the plurality of transmission links comprises at least a first link, a second link and a third link, wherein when de-activating one or more links in the LAG, the logic is configured to de-activate the first link in the LAG, and wherein when maintaining at least one of the links in the LAG as an active link, the logic is configured to maintain the second and third links as active links in the LAG.

19. The device of claim 12, wherein the plurality of transmission links comprises a first link, a second link and a third link, wherein when de-activating one or more links in the LAG, the logic is configured to de-activate the first and second links in the LAG, and wherein when maintaining at least one of the links in the LAG as an active link, the logic is configured to maintain the third link as the active link in the LAG.

20. The device of claim 12, wherein the logic is further configured to:

receive, from an interface device coupled to at least one link in the LAG, a first message instructing the device to terminate transmission via the LAG; and stop transmission via the plurality of ports in response to the first message.

* * * * *